United States Patent
Yamada et al.

(10) Patent No.: US 6,896,419 B2
(45) Date of Patent: May 24, 2005

(54) OPTICAL PICKUP

(75) Inventors: Masahiro Yamada, Kanagawa (JP); Tetsu Watanabe, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/471,806

(22) PCT Filed: Jan. 17, 2003

(86) PCT No.: PCT/JP03/00376
§ 371 (c)(1),
(2), (4) Date: Sep. 16, 2003

(87) PCT Pub. No.: WO03/060893
PCT Pub. Date: Jul. 24, 2003

(65) Prior Publication Data
US 2004/0114878 A1 Jun. 17, 2004

(30) Foreign Application Priority Data
Jan. 17, 2002 (JP) ........................................ 2002-009005

(51) Int. Cl.[7] .............................. G02B 6/42; G02B 6/27
(52) U.S. Cl. .......................................... 385/88; 385/11
(58) Field of Search .............................. 385/88, 11, 124

(56) References Cited

U.S. PATENT DOCUMENTS

| | | | |
|---|---|---|---|
| 4,626,679 A | 12/1986 | Kuwayama et al. | |
| 5,033,043 A | * 7/1991 | Hayakawa | 369/121 |
| 5,218,582 A | 6/1993 | Marchant | |
| 5,822,287 A | * 10/1998 | Kubota et al. | 369/44.38 |
| 6,349,082 B1 | 2/2002 | Horie et al. | |
| 2002/0024919 A1 | * 2/2002 | Lee et al. | 369/112.24 |
| 2002/0164106 A1 | * 11/2002 | Mizuno | 385/11 |

FOREIGN PATENT DOCUMENTS

| | | |
|---|---|---|
| DE | 3334120 A1 | 3/1984 |
| JP | 59-56236 A1 | 3/1984 |
| JP | 4-298840 A1 | 10/1992 |
| JP | 2000-67458 A1 | 3/2000 |

OTHER PUBLICATIONS

International Search Report dated Mar. 4, 2003.

* cited by examiner

Primary Examiner—John D. Lee
Assistant Examiner—Eric Wong
(74) Attorney, Agent, or Firm—Rader, Fishman & Grauer, PLLC; Ronald P. Kananen

(57) ABSTRACT

An optical pickup using an optical fiber module which includes optical fibers is provided, which can be small-sized and utilize a light beam from a light source at high efficiency. The optical pickup includes: an optical fiber module 20, in which an optical fiber 10 consists of: a first optical fiber 11 which is a field-distribution converting fiber and a second optical fiber 12 whose core has birefringence, both the optical fibers 11 and 12 are connected to each other at one end thereof, and the laser light beam L emitted from the semiconductor laser 1 is made to enter the other end of the first optical fiber 11; an optical head having at least an objective lens; an optical detector; wherein the optical fiber 10 is used as optical wiring to lead the laser light beam L emitted from the semiconductor laser 1 into the optical head.

3 Claims, 2 Drawing Sheets

OPTICAL PICKUP

TECHNICAL FIELD

The present invention relates to an optical pickup using an optical fiber module.

BACKGROUND ART

Conventionally, in order to reduce the size of an optical pickup, due to the necessity to avoid problems of heat emission and unnecessary radiation of electromagnetic waves from a semiconductor laser which is a light source and from a peripheral circuit thereof, the semiconductor laser and the optical head are disposed separately.

As an optical wiring to separate, as described above, an optical head and a semiconductor laser and to lead a light beam from the semiconductor laser into the optical head, an optical fiber is efficient and utilized.

Recently, attempts have been made to improve coupling efficiency between a semiconductor laser and an optical fiber, and to permit less alignment accuracy at a coupling portion.

For example, there was a method in which the diameter of the core of an optical fiber was enlarged at one end to which a semiconductor laser was coupled, and the core diameter was gradually reduced toward the other end, so as to come to its original core diameter of the optical fiber. By using this method, less alignment accuracy between the semiconductor laser and the optical fiber can be permitted,—and therefore the alignment was made without difficulties.

However, because in this method cross section of the core is circular at the end of the optical fiber to which the semiconductor laser is coupled, in order to improve the coupling efficiency from the semiconductor laser to the optical fiber this method requires an optical system such as an anamorphic prism which converts a laser light beam of elliptical cross section emitted from the semiconductor laser into that of circular cross section.

When such optical system as an anamorphic prism is constructed, it becomes difficult to reduce the size of an optical pickup.

In addition, since a conventional optical fiber is of a polarization-independent type, it is difficult to improve efficiency in utilizing a light beam, as an optical pickup.

In order to solve the above problems an optical fiber of such structure has been proposed, in which coupling efficiency is improved by making cross section of a laser light beam elliptical at an end of an optical fiber so as to correspond to that of a laser light beam emitted from a semiconductor laser, and conversion from a light beam having an elliptical cross section into a single-mode light beam having a circular cross section is made possible.

Specifically, an optical fiber formed by covering the core thereof with cladding is composed of: a first optical fiber in which an optical axis is assumed to be Z, both of the refractive index distribution profiles of the core in X and Y directions among three axes of X, Y and Z perpendicular to each other are made to quadratic index distribution profiles, and slopes of the refractive index distribution profiles in the corresponding X and Y directions are made different values from each other; and a second optical fiber formed of a single-mode optical fiber the core of which is covered with cladding, attached to one end of the first optical fiber.

However, even in the above optical fiber it is still difficult to sufficiently improve efficiency in utilizing a light beam as an optical pickup, because a single-mode optical fiber constituting the second optical fiber is a polarization-independent type optical fiber.

In order to solve the above described problems, the present invention provides, using an optical fiber module provided with optical fibers, an optical pickup which can be reduced in its size and also can utilize a light beam from a light source at high efficiency.

DISCLOSURE OF THE INVENTION

An optical pickup apparatus according to the present invention includes: a semiconductor laser; an optical fiber consisting of: a first optical fiber formed by covering the core thereof with cladding, in which an optical axis is assumed to be Z, both the refractive index distribution profiles of the core in X and Y directions among three axes of X, Y and Z perpendicular to each other are made to quadratic index distribution profiles, and slopes of the refractive index distribution profiles in the corresponding X and Y directions are made different values from each other and a second optical fiber formed by covering the core thereof with cladding, in which the core has birefringence with one end of respective optical fibers being connected to each other; an optical head having at least an objective lens; and an optical detector; wherein an optical fiber module is constructed with the semiconductor laser and the optical fiber disposed such that a laser light beam emitted from the semiconductor laser is made to enter the other end of the first optical fiber, and the optical fiber is used as optical wiring to lead the laser light beam emitted from the semiconductor laser into the optical head.

According to the above described construction of the optical pickup of the present invention, the first optical fiber, in which an optical axis is assumed to be Z, both the refractive index distribution profiles of the core in X and Y directions among three axes of X, Y and Z perpendicular to each other are made to quadratic index distribution profiles, and slopes of the refractive index distribution profiles in the corresponding X and Y directions are made different values from each other, is a field-distribution converting fiber which converts a field distribution (electromagnetic field distribution) of an incident light, and converts, for example, an incident light beam having an elliptical field distribution profile to a light beam having a circular field distribution profile.

The second optical fiber whose core has birefringence functions as a polarizing fiber or a polarization maintaining fiber and emits a light beam having a linear polarization.

Since the above first and second optical fibers are connected to each other at one end thereof, the first optical fiber can convert an incident light beam having, for example, an elliptical field distribution profile into a light beam having a circular field distribution profile to propagate the light beam efficiently to the second optical fiber, and the second optical fiber can emit a light beam having a linear polarization (a light beam efficiently utilized) suitable to be used in an optical pickup.

Furthermore, because an optical fiber module is constructed with the semiconductor laser and the optical fiber, having the above configuration, disposed such that a laser light beam emitted from the semiconductor laser is made to enter the other end of the first optical fiber, the first optical fiber becomes the above described field-distribution converting fiber, so that the efficiency can be improved when a light beam having an elliptical field distribution profile emitted from the semiconductor laser is made to enter the other end of the first optical fiber. As a result, the coupling efficiency between the semiconductor laser and the optical fiber is improved and the laser light beam emitted from the semiconductor laser can be utilized efficiently.

Also, from the second optical fiber a light beam having a linear polarization suitable to be used in an optical pickup (a light beam utilized efficiently) can be emitted.

In addition, because the coupling efficiency between the semiconductor laser and the optical fiber is improved by using the optical fiber of the above described construction as optical wiring and also a light beam having a linear polarization, which can be utilized efficiently in an optical pickup, can be emitted, an optical head can utilize efficiently the light beam emitted from the semiconductor laser.

BEST MODE FOR CARRYING OUT THE INVENTION

The present invention is an optical pickup apparatus including: a semiconductor laser; an optical fiber consisting of: a first optical fiber formed by covering the core thereof with cladding, in which an optical axis is assumed to be Z, both the refractive index distribution profiles of the core in X and Y directions among three axes of X, Y and Z perpendicular to each other are made to quadratic index distribution profiles, and slopes of the refractive index distribution profiles in the corresponding X and Y directions are made different values from each other and a second optical fiber formed by covering the core thereof with cladding, in which the core has birefringence with one end of respective optical fibers being connected to each other; an optical head having at least an objective lens; and an optical detector; wherein an optical fiber module is constructed with the semiconductor laser and the optical fiber disposed such that a laser light beam emitted from the semiconductor laser is made to enter the other end of the first optical fiber, and the optical fiber is used as optical wiring to lead the laser light beam emitted from the semiconductor laser into the optical head.

Further, the above described optical pickup according to the present invention is provided with a polarized beam splitter and a quarter wave plate disposed between the optical fiber and the objective lens.

Furthermore, in the above described optical pickup according to the present invention, the first optical fiber has the core, cross section of which is approximately elliptical, oval, or approximately rectangular, and a polarizing direction of the light beam emitted from the semiconductor laser approximately coincides with a major-axis direction of the cross section of the core of the first optical fiber.

Figure 1:
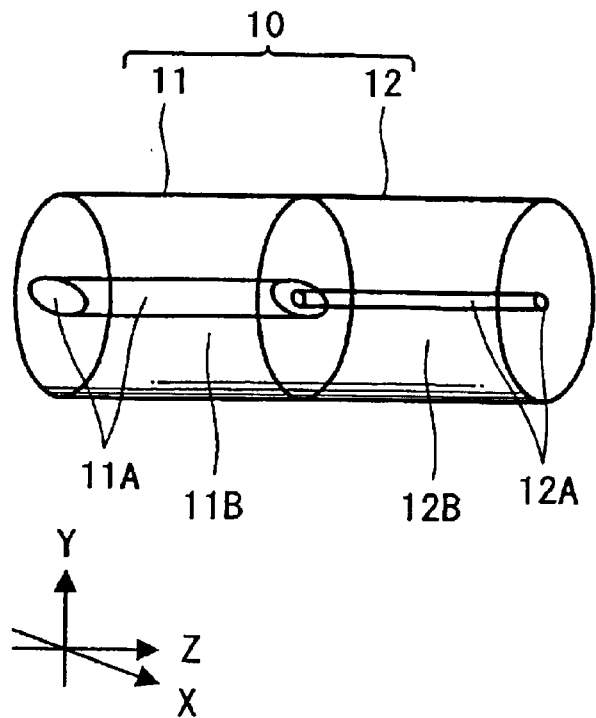
FIG. 1 is a schematic constitutional view showing an optical fiber according to an embodiment of the present invention.

FIG. 1 is a schematic constitutional view showing an embodiment of the optical fiber according to the present invention.

An optical fiber 10 is formed of a first optical fiber 11 and a second optical fiber 12 connected to each other at one end thereof.

The first optical fiber 11 is an optical fiber formed with the core 11A being covered with cladding 11B, and the optical axis thereof is assumed to be Z, both the refractive index distribution profiles of the core 11A in X and Y directions among three axes X, Y and Z perpendicular to each other are quadratic index distribution profiles, and respective slopes of the refractive index distribution profiles in the corresponding X and Y directions are made different values from each other.

Such optical fiber is called GIO fiber or GIF (Graded Index Fiber). As described above, since the slopes of the refractive index distribution profiles of the core in the X and Y directions are made different values and the refractive index distribution profiles of the core in the corresponding X and Y directions are different from each other, the cross section of the core appears to be elliptical.

Then, due to the difference between refractive index distribution profiles of the core in the X and Y directions, such optical fiber can convert a field distribution (electromagnetic field distribution) of a light beam passing through the optical fiber from an elliptical shape to a circular shape, and represents a so-called field-distribution converting fiber.

In other words, such optical fiber functions similarly to an anamorphic prism.

Since the above field-distribution converting fiber can be manufactured by the same method as that for manufacturing a conventional optical fiber, it can be manufactured at low production costs.

Further, the optical fiber 12 is an optical fiber formed with the core 12A being covered with cladding 12B, in which the core 12A has birefringence (with respect to a propagating light beam).

Since the core 12A has birefringence, specific directions called a fast-axis and a slow-axis exist.

The fast-axis is an axis of a low refractive index and the slow-axis is an axis of a high refractive index. That is, propagation speeds of light beams are different between those fast-axis and slow-axis.

Then, a light beam polarized in the direction of the fast-axis is susceptible to the lowest effective refractive index of the corresponding optical fiber. On the other hand, a light beam polarized in the direction of the slow-axis is susceptible to the highest effective refractive index of the corresponding optical fiber.

Therefore, depending on the polarizing direction of an input light beam, a propagation speed of the light beam varies.

Also, the relationship between a wavelength of a light beam and a propagation state of the light beam in the optical fiber changes non-propagation→single mode→multiple mode from a long wavelength side toward a short wavelength side. The wavelengths at which the propagation state changes are different between the fast-axis direction and the slow-axis direction, and the propagation state changes at longer wavelengths in the slow-axis.

Accordingly, the light beam within a certain range of wavelength does not propagate in the fast-axis direction and propagates in single mode in the slow-axis direction. In this case, the second optical fiber 12 functions as a polarizing fiber capable of propagating the light beam polarized only in one direction.

In addition, the light beam within a certain range of wavelength in the short wavelength side of the above described wavelength range propagates in single mode both in the fast-axis direction and the slow-axis direction. In this case, the second optical fiber 12 functions as a polarization maintaining fiber, because polarized waves in the directions of both axes are preserved and propagated.

Hereupon, when a light beam, for example, obliquely polarized with respect to both directions of the fast-axis and the slow-axis is made to input, within the range of wavelength where the optical fiber functions as a polarizing fiber the light beam polarized in the slow-axis direction is output; and within the range of wavelength where the optical fiber functions as a polarization maintaining fiber the light beam obliquely polarized in the directions of the fast-axis and the slow-axis is output, because the polarization in the directions of both the axes is preserved (since the amount of the polarized light beam is not necessarily preserved, the ratio of the amount of the polarized light beam corresponding to each axis, that is the angle to the axis, may change).

Therefore, when a light beam in the range of wavelength where the second optical fiber 12 functions as a polarizing fiber or a polarization maintaining fiber is input into the second optical fiber 12, a light beam having a linear polarization is output.

Further, although the core 12A of the second optical fiber 12 has birefringence, the cross section of the core 12A is approximately circular similar to that of a conventional single mode fiber.

Therefore, when a light beam having, for example, a circular cross section is made to enter the second optical fiber 12, a light beam having a circular cross section is output, and even though a polarizing direction is changed, the cross section of the output light beam remains circular.

The first optical fiber 11 and the second optical fiber 12 can be connected using a method conventionally known for connecting optical fibers.

According to the configuration of the above described optical fiber 10 shown in FIG. 1, since the first optical fiber 11 composed of a field-distribution converting fiber and the second optical fiber 12 whose core 12A has birefringence are connected to each other at one end thereof, an elliptical field distribution profile is converted to a circular field distribution profile by the field distribution converting function of the first optical fiber 11, so that a light beam can be efficiently input into the second optical fiber 12. Moreover, because the core 12A of the second optical fiber 12 has birefringence, the second optical fiber 12 operates as a polarizing fiber or a polarization maintaining fiber to output a light beam having a linear polarization.

Consequently, it becomes possible to enhance the efficiency in utilizing a light beam when the above optical fiber is used as optical wiring between a semiconductor laser and an optical head in an optical pickup.

Figure 2:
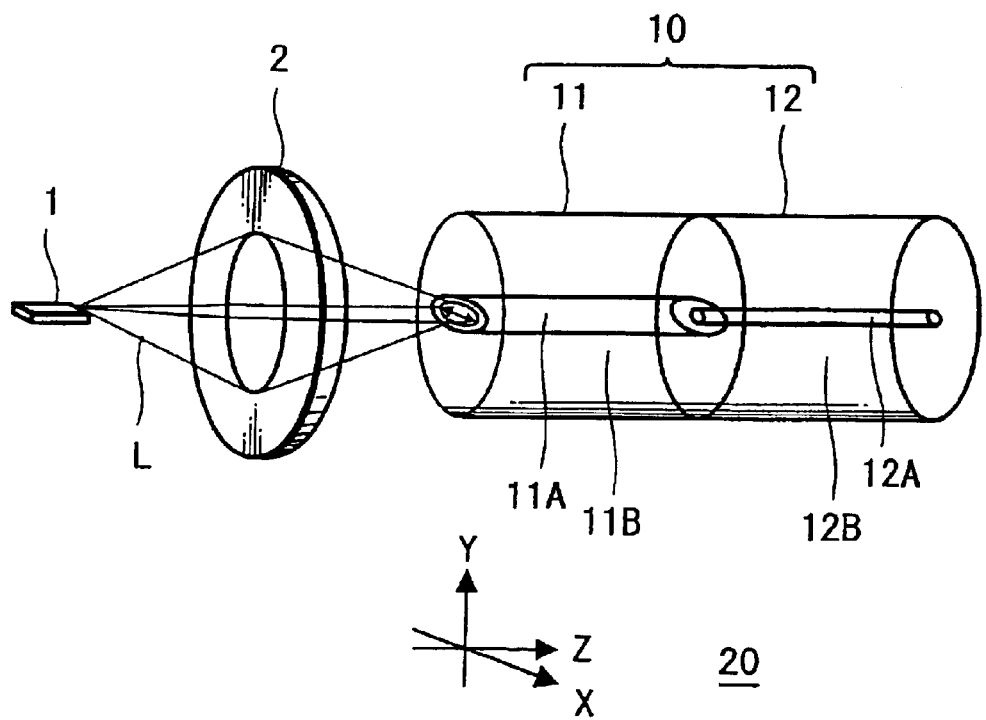
FIG. 2 is a schematic constitutional view showing an optical fiber module provided with a semiconductor laser and the optical fiber shown in FIG. 1.

Further, a schematic constitutional view of an optical fiber module, in which a semiconductor laser and the optical fiber 10 in FIG. 1 are coupled, is shown in FIG. 2.

The optical fiber module 20 includes a semiconductor laser 1, a lens (focusing lens) 2, and the optical fiber 10 which is shown in FIG. 1.

A light beam L emitted from the semiconductor laser 1 is focused on one end of the first optical fiber (field-distribution converting fiber) 11 by the focusing lens 2.

The output light beam emitted from the semiconductor laser 1 has generally an elliptical cross section, and a polarizing direction thereof coincides with a minor axis direction of a light beam having an elliptical cross section in a far field. This direction is in parallel with, for example, a plane of an active layer in a semiconductor laser chip.

And the light beam L focused on one end of the first optical fiber 11 has generally an elliptical cross section in accordance with that of the light beam emitted from the semiconductor laser 1.

Further, while propagating in the first optical fiber (field-distribution converting fiber) 11, cross section of the light beam L is converted from elliptical shape to circular shape and is converged on the core 12A of the second optical fiber 12 which is connected to the first optical fiber (field-distribution converting fiber) 11.

Then, the light beam is output as a light beam having a linear polarization after propagating through the second optical fiber (functioning as a polarizing fiber or a polarization maintaining fiber) 12.

Hereupon, in order to efficiently couple with the field-distribution converting fiber constituting the first optical fiber 11, it is desirable that a polarizing direction of an incident light beam coincides with the major axis direction of the core in the field-distribution converting fiber (X axis direction in the configuration shown in FIG. 2).

Thus, the polarizing direction of the laser light beam L emitted from the semiconductor laser 1 is made to approximately coincide with the direction of the major axis of the core 11A having elliptical cross section in the first optical fiber (field-distribution converting fiber) 11. That is, the same direction or the directions in the proximity.

As a result, the shape of the semiconductor laser 1 (such as a direction of active layer or the like) is made to coincide with the direction of the major axis of the core 11A having elliptical cross section in the first optical fiber (field-distribution converting fiber) 11.

Accordingly, the semiconductor laser 1 and the first optical fiber (field-distribution converting fiber) 11 can be coupled efficiently.

Furthermore, it is desirable that the polarizing direction of the laser light beam L emitted from the above described semiconductor laser 1 is made to approximately coincide with either direction of the fast-axis or the slow-axis of the core 12A having birefringence in the second optical fiber 12. Particularly, when the second optical fiber 12 functions as a polarizing fiber in accordance with the wavelength of the laser light beam L, it is desirable that the polarizing direction of the laser light beam L emitted from the semiconductor laser 1 is made to approximately coincide with the direction of the slow-axis of the core 12A in the second optical fiber 12.

By thus making the polarizing direction of the laser light beam L approximately coincide with either the fast-axis direction or the slow-axis direction of the core 12A in the second optical fiber 12, conceivable loss on the propagation of the laser light beam from the first optical fiber 11 to the second optical fiber 12 can be reduced so as to propagate efficiently.

Further, although the length of the first optical fiber 11 and that of the second optical fiber 12 are shown approximately the same in FIGS. 1 and 2, it should be noted that each length of the optical fiber 11 and optical fiber 12, and the ratio thereof are not particularly specified.

In addition, although cross section of the core 11A in the first optical fiber 11 is elliptical in FIGS. 1 and 2, the cross section thereof may be either approximately elliptical, oval, or approximately rectangular. In either case, the direction of the major axis (lengthwise direction) of the core 11A should be made to approximately coincide with the polarizing direction of the laser light beam L emitted from the. semiconductor laser 1.

If the first optical fiber 11 has the length of about 200 μm, the function of converting the cross section of a light beam from elliptical shape to circular shape (field-distribution converting function) can be sufficiently performed.

Also, the second optical fiber 12 can be extended longer if necessary.

According to the above described configuration of the optical fiber module 20 shown in FIG. 2, since the module is provided with the semiconductor laser 1 and the optical fiber 10 shown in FIG. 1, the light beam L having an elliptical cross section emitted from the semiconductor laser can be converted within the optical fiber 10 to output a light beam having a linear polarization, which is suitable to be used in an optical pickup.

In addition, since the polarizing direction of the laser light beam L emitted from the semiconductor laser 1 is made to approximately coincide with the direction of the major axis of the core 11A having an elliptical cross section, the coupling efficiency between the semiconductor laser 1 and the first optical fiber 11 improves, so that a laser light beam can be propagated efficiently from the semiconductor laser 1 to the optical fiber 10.

Figure 3:
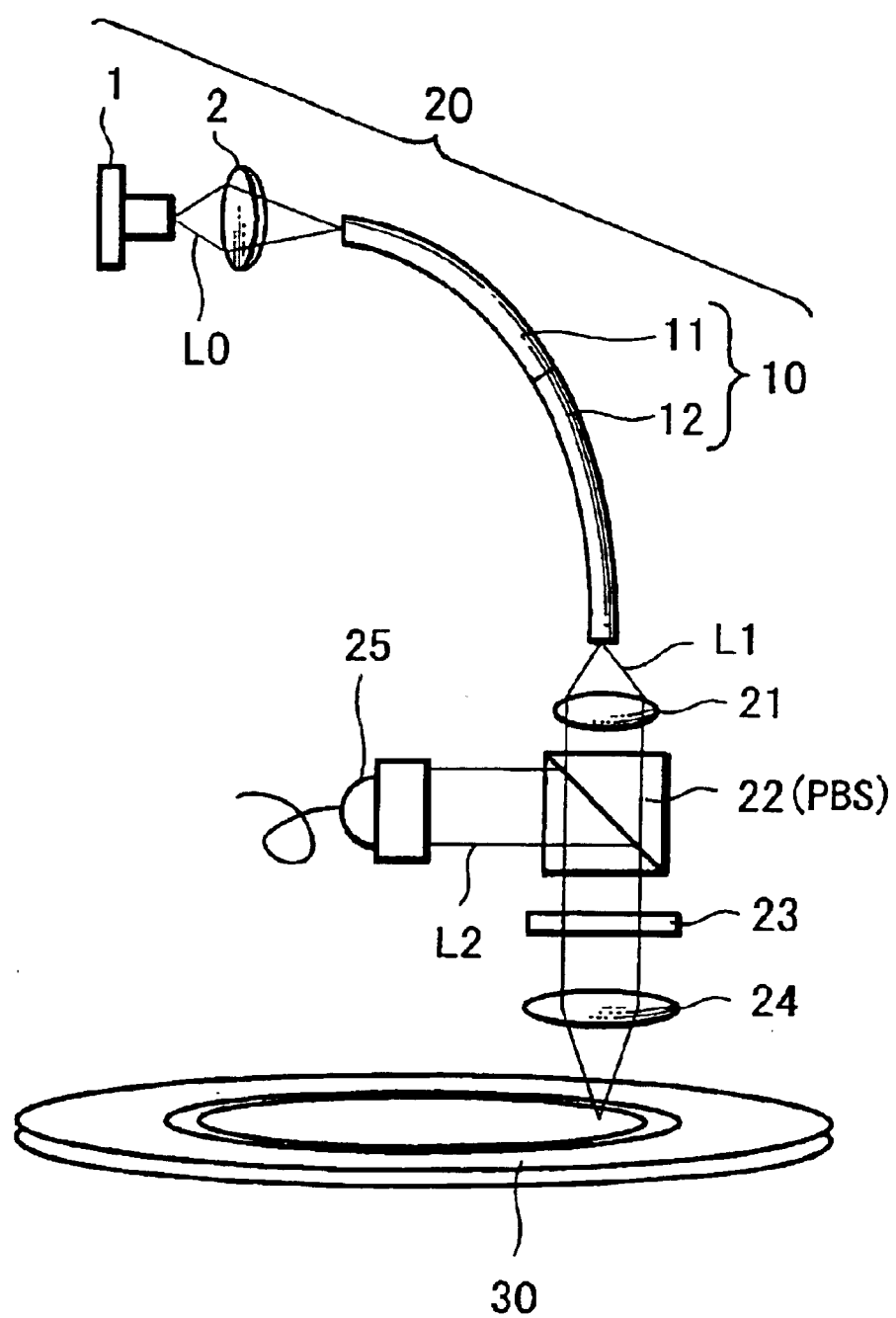
FIG. 3 is a schematic constitutional view showing an optical pickup, to which the structures of FIGS. 1 and 2 are applied, of an embodiment of the present invention.

Subsequently, FIG. 3 shows an schematic constitutional view of an optical pickup according to an embodiment of the present invention, in which the optical fiber 10 shown in FIG. 1 and the optical fiber module 20 shown in FIG. 2 are employed.

The optical pickup is configured with the semiconductor laser 1, the lens 2, and as optical wiring the optical fiber module 20 consisting of the optical fiber 10 in which the first optical fiber 11 and the second optical fiber 12 are connected to each other at one end thereof, as described above; and is provided with a lens 21, a polarized beam splitter (PBS) 22, a λ/4 plate (quarter wavelength plate) 23, and an objective lens 24 at the other end of the optical fiber 10 with an optical detector 25 provided on the side of the polarized beam splitter 22.

Then, the optical pickup is configured to perform recording and reproducing information onto an optical recording medium, for example, an optical disc 30.

The polarized beam splitter (PBS) 22 is set to transmit a light beam L1 from the optical fiber 10 and to reflect a light beam L2 which is reflected back on the optical disc 30.

Hereinafter, an operation of the optical pickup will be explained.

A light beam L0 emitted from the semiconductor laser 1 is led into the optical fiber 10 through the lens (focusing lens) 2. Then, since the optical fiber 10 has the structures shown in FIGS. 1 and 2, that is, the structure in which the first optical fiber (field-distribution converting fiber) 11 and the second optical fiber (optical fiber whose core 12A has birefringence) 12 are connected to each other, the light beam L0 having an elliptical cross section is converted to that of a circular cross section and is further changed to the linearly polarized light beam L1, and is emitted from the optical fiber 10.

The light beam L1 emitted from the optical fiber 10 passes through the polarized beam splitter (PBS) 22 and is converted into a circularly polarized light beam at the λ/4 plate 23, and is converged on a recording plane of the optical disc 30 by the objective lens 24. Accordingly, on the optical disc 30 recording and reproducing of data are performed.

A reflected light beam from the optical disc 30 passes through the objective lens 24 and is converted at the λ/4 plate 23 to the linearly polarized light beam L2 from a circularly polarized light beam.

The direction of the linear polarization of the light beam L2 is approximately perpendicular to the direction of the linearly polarized laser beam L1 emitted from the optical fiber 10. Accordingly, the light beam L2 is reflected by the polarized beam splitter (PBS) 22 and is received and detected by the optical detector 25.

As described above, since the optical fiber 10 which outputs the linearly polarized light beam L1, the λ/4 plate 23, and the polarized beam splitter 22 are combined and used, all the light beams L1 output from the optical fiber 10 can be led to the optical disc 30 and also all the reflected light beams from the optical disc 30 can be led to the optical detector 25.

Accordingly, the light beam L0 emitted from the semiconductor laser 1 can be utilized efficiently without any loss.

Needless to say, it is also possible to set appropriate reflectivity and transmissivity by selecting conditions and the like for manufacturing, for example, multiple-layer film which is a component of the polarized beam splitter 22. Thus, it becomes possible to control an output power of a semiconductor laser by making, for example, a small part of a forward-going light beam reflect in the polarized beam splitter 22 and to be monitored.

Also, the cross section of the light beam L1 output from the optical fiber 10 is approximately circular and therefore the coupling efficiency with the lens 21 is excellent.

In addition, as a beam spot of light converged on the optical disc 30 is also approximately circular, excellent recording and reproducing characteristics can be obtained.

According to the optical pickup of the above mentioned embodiment of the present invention, since the optical fiber 10 and the optical fiber module 20 each having the aforementioned structures are included, the coupling efficiency with respect to the semiconductor laser 1 and the optical fiber 10 is improved, thereby enabling the light beam L0 emitted from the semiconductor laser 1 to be used efficiently without any waste.

Also, since the light beam L1 emitted from the optical fiber 10 has an approximately circular cross section, the shape of the beam spot of light converged on the optical disc 30 is improved. As a result, recording and reproducing characteristics of an optical disc are improved.

Furthermore, since there is no need to provide an anamorphic prism or a specific lens such as an axially asymmetric lens or the like in order to improve coupling efficiency with an optical fiber, an optical pickup can be small-sized without difficulties.

Therefore, when an optical recording and reproducing apparatus and an optical disc apparatus are configured using the optical pickup according to an embodiment of the present invention, an apparatus which is small-sized and has excellent recording and reproducing characteristics can be realized.

Further, with respect to the optical fiber module 20 in FIG. 2 and the optical pickup in FIG. 3, the lens (focusing lens) 2 provided between the semiconductor laser 1 and the optical fiber 10 may be constructed by either a single lens or a lens set having plurality of lenses combined.

As shown in FIG. 3, in the optical pickup according an embodiment of the present invention, the polarized beam splitter (PBS) 22 as a polarized light beam splitting element and the λ/4 plate 23 which performs conversion between a linearly polarized light beam and a circularly polarized light beam are disposed between the optical fiber 10 and the objective lens 24.

Then, the polarized beam splitter (PBS) 22 separates the laser beam L1 which is emitted from the optical fiber 10 and directed to the optical disc 30, and the laser beam L2 which is reflected back from the optical disc 30.

The optical pickup of the present invention may be configured to separate the above laser light beams, using a polarized light beam splitting element having a structure other than a polarized beam splitter.

Conventionally there are known other optical pickups in which a laser light beam going forward to an irradiated part such as a recording medium and the laser light beam reflected back from the irradiated part are separated, using a configuration other than the combination of the λ/4 plate 23 and the polarized beam splitter (PBS) 22.

Also, by applying the present invention to an optical pickup having the above configuration, and by employing the configuration of the optical fiber and the optical fiber module according to the present invention as optical wiring between a semiconductor laser and a optical head, it is possible to improve efficiency in utilizing a laser light beam and to reduce the size of the optical pickup.

The present invention is not limited to the above described embodiment, but within the gist thereof various other modified configurations are possible.

According to the above described present invention, it is possible to efficiently utilize a light beam emitted from a semiconductor laser as a light source without any waste.

In addition, a light beam emitted from an optical fiber becomes linearly polarized light and therefore can be utilized efficiently in an optical pickup.

Moreover, since a light beam emitted from a optical fiber has an approximately circular cross section, a beam spot of converged light, which is formed on an irradiated part such as an optical disc by an objective lens, is improved.

Accordingly, in an optical pickup used for an optical disc, recording and reproducing characteristics of an optical disc can be improved.

Furthermore, since optical components such as an anamorphic prism, a lens, and the like are not required to improve coupling efficiency with an optical fiber, an optical pickup can be small-sized without difficulties.

Consequently, by constructing an optical recording and reproducing apparatus or an optical disc apparatus using an optical pickup of the present invention, the apparatus which is small-sized and has excellent recording and reproducing characteristics can be realized.

What is claimed is:

1. An optical pickup comprising:

optical wiring consisting of: a first optical fiber formed by covering a first core thereof with cladding, in which an optical axis is assumed to be Z, both the refractive index distribution profiles of, the first core in X and Y directions among three axes of X, Y and Z perpendicular to each other are made to quadratic index distribution profiles, and slopes of the refractive index distribution profiles in the corresponding X and Y directions are made different values from each other; abd a second optical fiber formed by covering a second core thereof with cladding, in which the second core has birefringence, wherein a first end of the first optical fiber and a first end of the second optical fiber are are connected to each other, a semiconductor laser at a second end of the first optical fiber;

an optical head at a second end of the second optical fiber, the optical head having at least an objective lens; and an optical detector at a second end of the second optical fiber, wherein an optical fiber module is constructed with said semiconductor laser and said optical wiring disposed such that a laser light beam emitted from said semiconductor laser is made to enter a second end of said first optical fiber, and said optical wiring directs the laser light beam emitted from said semiconductor laser into said optical head, and wherein a cross section of the first coe in said first optical fiber is made in one of an approximately elliptical, oval, or approximately rectangular shape, and a polarizing direction of the light beam emitted from said semiconductor laser approximately coincides with a direction of a major axis of the cross section of the first core in said first optical fiber.

2. The optical pickup according to claim 1, wherein a polarized beam splitting element and a ¼ wavelength plate are disposed between said optical wiring and said objective lens.

3. The optical pickup according to claim 1, wherein cross section of the core in said first optical fiber is made approximately elliptical, oval, or approximately rectangular, and a polarizing direction of the light beam emitted from said semiconductor laser approximately coincides with direction of a major axis of the cross section of the in said first optical fiber.

* * * * *

UNITED STATES PATENT AND TRADEMARK OFFICE
CERTIFICATE OF CORRECTION

PATENT NO. : 6,896,419 B2
DATED : May 24, 2005
INVENTOR(S) : Masahiro Yamada et al.

It is certified that error appears in the above-identified patent and that said Letters Patent is hereby corrected as shown below:

<u>Column 10,</u>
Line 11, "abd" should read -- and --.
Line 15, "are are" should read -- are --.
Line 32, "coe" should read -- core --.

Signed and Sealed this

Sixth Day of September, 2005

JON W. DUDAS
*Director of the United States Patent and Trademark Office*